(12) United States Patent
Colby et al.

(10) Patent No.: US 10,048,104 B2
(45) Date of Patent: Aug. 14, 2018

(54) SENSOR AND/OR POWER HARVESTING APPARATUS HAVING A WIDE DYNAMIC RANGE FOR RESPONDING TO A DRIVING ROTATIONAL INPUT

(71) Applicant: DYNAPAR CORPORATION, Gurnee, IL (US)

(72) Inventors: Edward G. Colby, Cambridge (GB); Andrew N. Dames, Cambridge (GB); Edward J. Taylor, Cambridgeshire (GB); Cathleen M. Clausen, Wilmington, NC (US)

(73) Assignee: Dynapar Corporation, Gurnee, IL (US)

( * ) Notice: Subject to any disclaimer, the term of this patent is extended or adjusted under 35 U.S.C. 154(b) by 0 days.

(21) Appl. No.: 14/646,525

(22) PCT Filed: Nov. 21, 2013

(86) PCT No.: PCT/US2013/071194
§ 371 (c)(1),
(2) Date: Jul. 15, 2015

(87) PCT Pub. No.: WO2014/081919
PCT Pub. Date: May 30, 2014

(65) Prior Publication Data
US 2018/0106649 A1    Apr. 19, 2018

Related U.S. Application Data

(60) Provisional application No. 61/728,844, filed on Nov. 21, 2012.

(51) Int. Cl.
*H02P 1/18* (2006.01)
*F03B 13/10* (2006.01)
*G01F 1/58* (2006.01)

(52) U.S. Cl.
CPC .................................... *G01F 1/586* (2013.01)

(58) Field of Classification Search
None
See application file for complete search history.

(56) References Cited

U.S. PATENT DOCUMENTS 3,561,835 A  *  2/1971  Fyfe ...................... G01F 15/063
                                                              310/156.32
4,532,460 A  *  7/1985  Gale ................... B60L 11/1807
                                                              310/35
(Continued)

FOREIGN PATENT DOCUMENTS

EP            0162652          5/1986

*Primary Examiner* — Harshad R Patel
(74) *Attorney, Agent, or Firm* — Robert L. Wolter; Beusse, Wolter, Sanks & Maire PLLC

(57) ABSTRACT

Sensor and/or power-harvesting apparatus are provided for sensing and/or harvesting energy across a relatively wide dynamic range of a driving rotational input. The apparatus may include a rotor magnet (10, 62) responsive to a driving rotational input (14, 64). Utilization of a togging effect or a magnetic spring effect results in certain rapid-rotation events where the rotor magnet can rapidly rotate regardless of a low rate of rotation of the driving rotational input. A coil assembly (28, 75) is magnetically coupled to the rotor magnet to generate a signal in response to rotation of the rotor magnet during the rapid-rotation events. This signal may be used to harvest electrical energy and/or may be processed to determine characteristics of the driving rotational input.

27 Claims, 5 Drawing Sheets

(56) References Cited

U.S. PATENT DOCUMENTS

| | | | | |
|---|---|---|---|---|
| 4,720,640 | A | * | 1/1988 | Anderson ............. F03B 13/083 290/43 |
| 4,745,345 | A | * | 5/1988 | Petersen ................. H02P 6/085 310/68 R |
| 5,424,632 | A | | 6/1995 | Montagu |
| 5,757,662 | A | * | 5/1998 | Dyer .................. B23Q 11/0035 700/279 |
| 5,878,004 | A | | 3/1999 | Miyauchi et al. |
| 6,018,200 | A | * | 1/2000 | Anderson ............ B23K 9/1062 290/1 A |
| 7,282,878 | B1 | * | 10/2007 | Rakov ...................... H02P 6/08 318/400.01 |
| 2005/0110353 | A1 | | 5/2005 | Kramer |
| 2006/0275155 | A1 | * | 12/2006 | Thibodeau .............. F04B 17/04 417/410.1 |
| 2012/0169054 | A1 | | 7/2012 | Roos |

\* cited by examiner

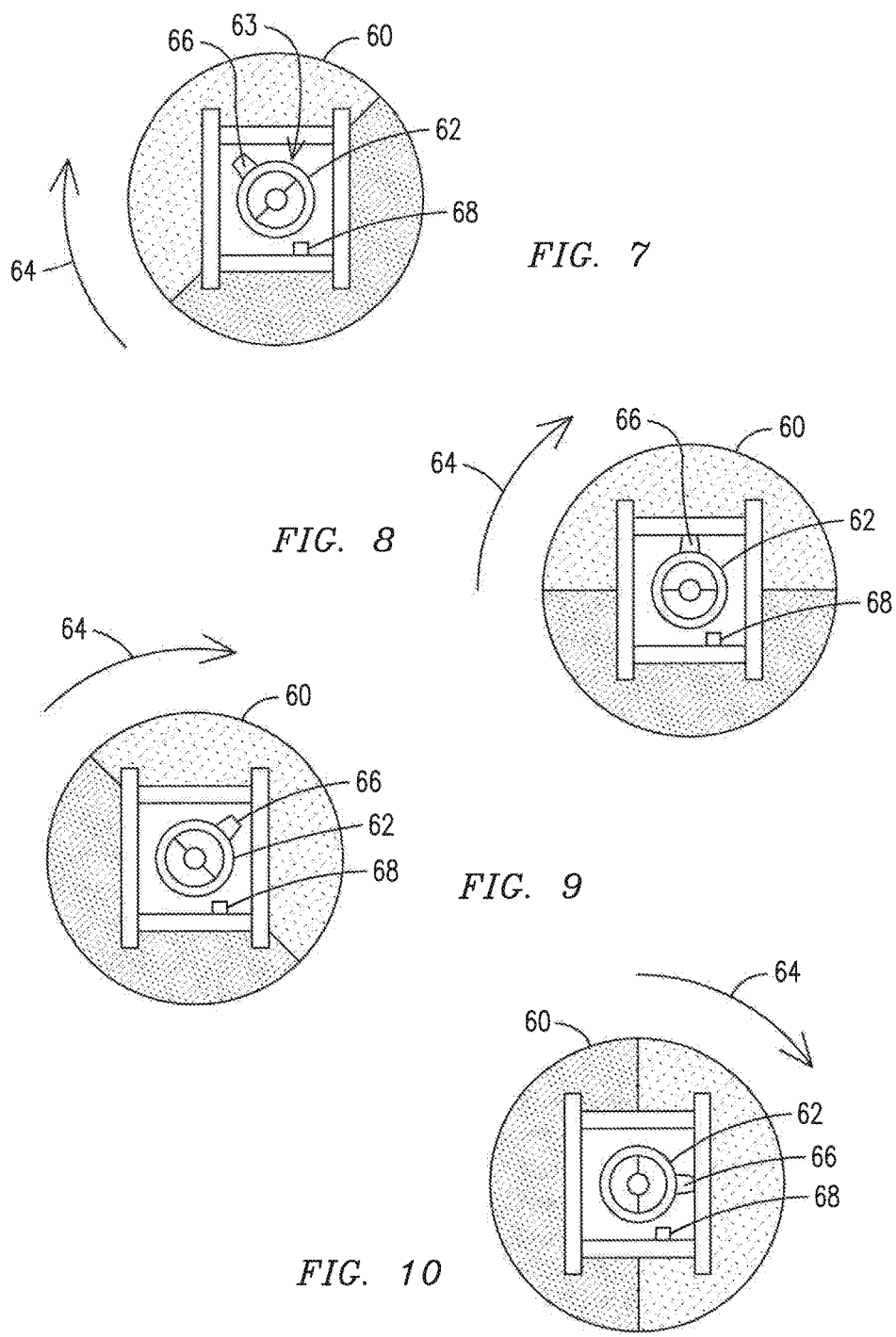

SENSOR AND/OR POWER HARVESTING APPARATUS HAVING A WIDE DYNAMIC RANGE FOR RESPONDING TO A DRIVING ROTATIONAL INPUT

CROSS-REFERENCE TO RELATED APPLICATIONS

This application is a 371 national stage of PCT/US2013/071194 filed Nov. 21, 2013, which claims the benefit of U.S. Provisional Application No. 61/728,844 filed Nov. 21, 2012, which is incorporated herein by reference in its entirety.

FIELD OF THE INVENTION

The present application is generally related to fluid metering apparatuses, and, more particularly, to apparatus for sensing and/or harvesting energy across a relatively wide dynamic range of a driving rotational input.

BACKGROUND OF THE INVENTION

In industrial applications as well as consumer applications, there frequently arises a need to, for example, measure the quantity and/or flow rate of fluid flow through a conduit; or to measure the rotation of a shaft. For example, conventional water meters operate by measuring the action of the fluid flow on a movable part, such as a notating disc, paddle wheel or turbine. This creates rotation which may be used to drive a mechanical counter or register, which in turn records and displays an accumulated value of fluid flow consumption over a period of time. This is conventionally read by service personnel who routinely checks each of the meters to manually record the values displayed.

Certain improvements have been made by utilizing flow meter devices involving battery-powered registers. Notwithstanding of design techniques intended to minimize power consumption, the batteries have a limited life time which eventually requires costly and burdensome replacement. Moreover, the performance of such battery-powered registers may be substantially susceptible to ambient temperature variations and may involve hazardous chemicals which require safe disposal at the end of the register's life. Accordingly, at least in view of the foregoing shortcomings, an improved sensor and/or power harvesting apparatus is desirable.

SUMMARY OF THE INVENTION

Generally, aspects of the present invention in one non-limiting embodiment may provide a sensor apparatus comprising a rotor assembly including a rotor magnet responsive to a driving rotational input. A pole-piece assembly may be magnetically coupled to the rotor magnet and may include a pole-piece configured to effect a respective detent torque in at least two detent locations. As the driving rotational input rotates beyond a threshold angle, the detent torque is overcome, which causes the rotor magnet to angularly accelerate towards the other of the detent locations irrespective of a relatively low rate of rotation of the driving rotational input. A coil assembly is magnetically coupled to the rotor magnet and the pole-piece assembly to generate a signal in response to rotation of the rotor magnet between the two detent locations. A processor is responsive to the signal from the coil assembly to determine at least one characteristic of the rotational input.

Further aspects of the present invention in another non-limiting embodiment may provide a power-harvesting apparatus comprising a rotor assembly including a rotor magnet responsive to a driving rotational input. A pole-piece assembly is magnetically coupled to the rotor magnet and may include a pole-piece configured to effect a respective detent torque in at least two detent locations. As the driving rotational input rotates beyond a threshold angle, the detent torque is overcome and this causes the rotor magnet to angularly accelerate towards the other detent location irrespective of a relatively low rate of rotation of the driving rotational input. A coil assembly is magnetically coupled to the rotor magnet and the pole-piece assembly to generate a signal comprising a stream of pulses in response to rotation of the rotor magnet. At least one circuit component is connected to the coil assembly to receive the stream of pulses generated by the coil assembly and accumulate electrical energy extracted from the received stream of pulses.

Still further aspects of the present invention in yet another non-limiting embodiment may provide apparatus for sensing and power-harvesting comprising a rotor assembly comprising a rotor magnet responsive to a driving rotational input. A pole-piece assembly is magnetically coupled to the rotor magnet and may include a pole-piece configured to effect a respective detent torque in at least two detent locations. As the driving rotational input rotates beyond a threshold angle, the detent torque is overcome, and this causes the rotor magnet to angularly accelerate towards the other detent location irrespective of a relatively low rate of rotation of the driving rotational input. A coil assembly is magnetically coupled to the rotor magnet and the pole-piece assembly to generate a signal comprising a stream of pulses in response to rotation of the rotor magnet. A processor is configured to determine at least one characteristic of the rotational input. A wakeup switching circuit is responsive to the stream of pulses to awake the processor from a power saving condition to determine the characteristic of the rotational input based on the stream of pulses from the coil assembly. At least one circuit component may be connected to the coil assembly to further receive the stream of pulses generated by the coil assembly and accumulate electrical energy extracted from the received stream of pulses.

In another non-limiting embodiment a sensor apparatus may include a drive magnet arranged to produce a rotating magnetic field in response to a driving rotational input. A rotor assembly includes a rotor magnet responsive to the rotating magnetic field from the drive magnet. The rotor assembly includes a mechanical stop to impede further rotation of the rotor magnet beyond a predefined location of the rotor assembly as the rotating magnetic field continues to rotate. A magnetic spring effect is established between the stopped rotor magnet and the rotating magnetic field, which eventually causes the rotor magnet to angularly accelerate and rotate away from the mechanical stop irrespective of a relatively low rate of rotation of the driving rotational input. A coil assembly is magnetically coupled to the rotor magnet to generate a signal in response to the rotation of the rotor magnet away from the mechanical stop. A processor may be responsive to the signal from the coil assembly to determine data indicative of at least one characteristic of the rotational input.

BRIEF DESCRIPTION OF THE DRAWINGS

Aspects of the invention may be appreciated in view of the drawings that show:

FIGS. 7-15 represent a temporal flow sequence of views for conceptually illustrating an example embodiment where a rotor magnet, which may be part of a rotor assembly embodying further aspects of the present invention, can angularly accelerate in a relatively rapid fashion from a stopped condition in response to a magnetic spring effect regardless of whether a driving rotational input may comprise a relatively low rate of rotation.

DETAILED DESCRIPTION OF THE INVENTION

Figure 1:
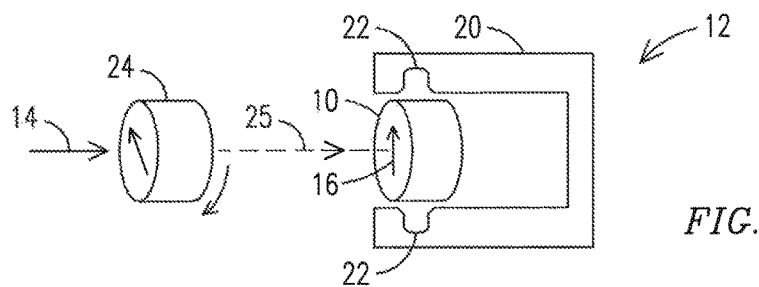
FIGS. 1-3 represent a temporal flow sequence of views for conceptually illustrating an example condition where a rotor magnet, which may be part of a rotor assembly embodying aspects of the present invention, can angularly accelerate in a relatively rapid fashion between at least two detent positions regardless of whether a driving rotational input may comprise a relatively low rate of rotation.

The present inventors have cleverly recognized certain limitations in connection with known metering devices that may be powered and/or actuated by action of a fluid flow and/or rotation of a shaft. These devices tend to exhibit problematic operation during conditions involving relatively low flow rates. For example, a power converter responsive to the fluid flow may not generate a sufficient level of electrical energy under such low flow rate conditions to either power the metering device and/or trigger a response from the metering device.

In view of such recognition, the present inventors propose innovative sensing apparatus and techniques for achieving accurate and reliable sensing of a driving rotational input (e.g., a rotational stimulus), which may be sensed by a sensor and/or may be utilized by a power-harvesting apparatus embodying aspects of the present invention. Additional aspects of the present invention allow sensing and/or harvesting of energy across a relatively wide dynamic range of the driving rotational input being sensed by the apparatus. In one example embodiment, this may be achieved by an electromotive apparatus adapted to store energy (e.g., magnetic and/or mechanical energy) at certain rotor locations (e.g., detent locations), and further adapted to relatively quickly release such energy and quickly accelerate when released from a given detent location to reach another detent location. In another example embodiment, this may be achieved by an electromotive apparatus adapted to store energy by way of a magnetic spring effect achieved during a stopped rotor condition at a predefined rotor location, and further adapted to relatively quickly release such energy when the magnetic spring effect causes the rotor to rapidly accelerate and flyback (e.g., return) from the stop location.

In either case, an example result is that an apparatus embodying aspects of the present invention can sense the rotational input and/or generate energy even when the driving rotational input comprises a relatively low rate of rotation. For example, there is essentially no reduction in harvesting efficiency even when the driving rotational input may have a rate of rotation practically approaching a zero value.

In the following detailed description, various specific details are set forth in order to provide a thorough understanding of depicted embodiments. However, those skilled in the art will understand that such embodiments may be practiced without these specific details; that the depicted embodiments are non-limiting embodiments; and that alternative embodiments may be implemented. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding the embodiments. However, the order of description should not be construed as to imply that these operations need be performed in the order they are presented, nor that they are even order dependent unless otherwise so described. Moreover, repeated usage of the phrase "in one embodiment" does not necessarily refer to the same embodiment, although it may. Lastly, the terms "comprising", "including", "having", and the like, as used in the present application, are intended to be synonymous unless otherwise so indicated.

In one example embodiment, a sensor and/or power harvesting apparatus embodying aspects of the present invention may include a rotor assembly including a rotor magnet responsive to a driving rotational input, which may be conveyed by way of a drive magnet. In one example embodiment, the driving rotational input may be effected by a fluid flow (e.g., water flow or gas flow in a pipe). In another example embodiment, the driving rotational input may be effected by a rotating structure (e.g., a rotating shaft).

Example Embodiments Based on Cogging

Figure 2:
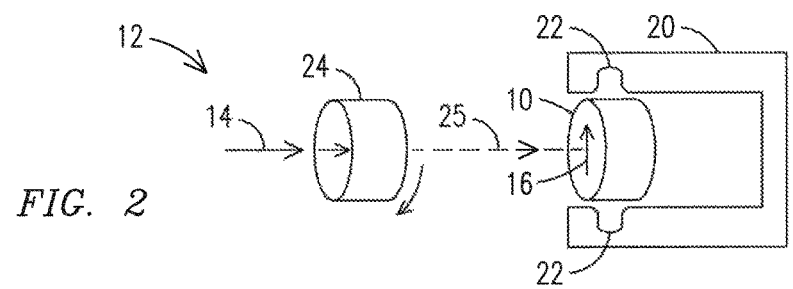
Figure 3:
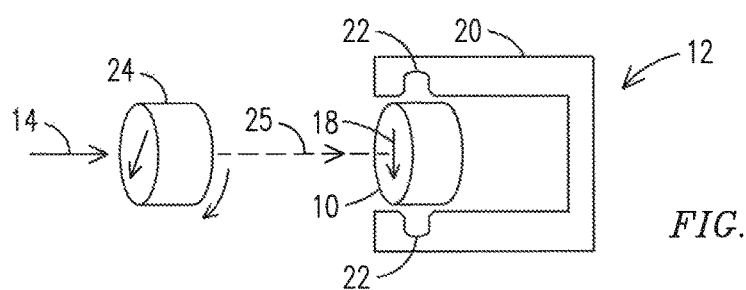

FIGS. 1-3 represent a temporal flow sequence of views for conceptually illustrating an example condition where a rotor magnet 10, which is part of a rotor assembly 12, can angularly accelerate in response to a driving rotational input 14 in a relatively rapid fashion from a first detent location (schematically represented by the views illustrated in FIGS. 1 and 2 respectively showing an upwardly pointing arrow 16 drawn on rotor magnet 10) towards a second detent location (schematically represented by the view illustrated in FIG. 3 showing a downwardly pointing arrow 18 drawn on rotor magnet 10).

Rotor assembly 12 may comprise a pole-piece assembly 20 magnetically coupled to rotor magnet 10. Pole-piece assembly 20 includes a pole-piece 22 configured to effect a respective detent torque (which may also be referred in the art as a "coming torque") in at least two detent locations. For example, as a drive magnet 24 rotates in response to rotational input 14 beyond a threshold angle, the value of a magnetic driving torque 25 applied by drive magnet 24 to rotor magnet 10 may be sufficiently high to overcome the detent torque, and this causes rotor magnet 10 to angularly accelerate (snap) in a relatively rapid fashion towards the other detent location regardless of whether the driving rotational input may comprise a relatively low rate of rotation.

In one example embodiment, pole-piece 22 defines an air gap with a profile configured to generate the detent torque at the detent locations. In one example embodiment, the profile of the air gap defined by pole-piece 22 may be arranged to provide at least two stable detent locations (e.g., each comprising a relatively narrow section of a suitable ferromagnetic material, such as iron, to provide corresponding narrow detent locations) for rotor magnet 10. These detent locations may be symmetrically located about the circumference of the rotor (e.g., angularly separated from one another by an angle of 180 degrees).

Figure 5:
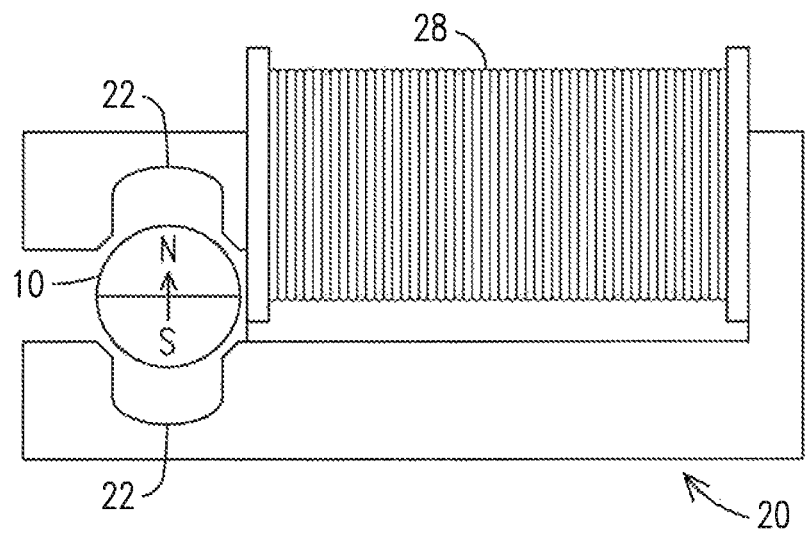
FIG. 5 primarily shows a pictorial view of one example embodiment of a sensor and/or power harvesting apparatus embodying aspects of the present invention.
Figure 6:
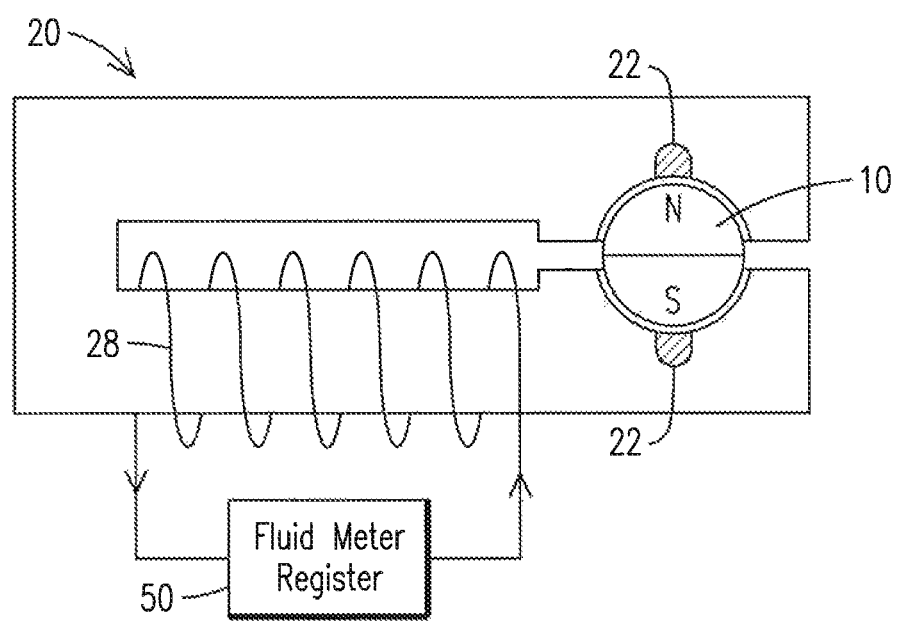
FIG. 6 is a schematic of a flow meter register embodying a sensor and/or power harvesting apparatus embodying aspects of the present invention.

In one example embodiment, rotor magnet 10 may be symmetrically and diametrically magnetised, as schematically represented by the respective magnetic poles labelled N and S in FIGS. 5 and 6. It is contemplated that rotor magnet 10 could be separate from a coaxial generator magnet (not shown) which may be broadly magnetically coupled to pole-piece assembly 20. It is further contemplated that the detent torque need not be effected by way of magnetic coupling between rotor magnet 10 and pole-piece 22 since such a torque could, in an alternative example embodiment, be generated by way of mechanical coupling between rotor magnet 10 and pole-piece assembly 20 alone or in combination with such magnetic coupling. For example, the detent/release functionality could be implemented by way of a biasing spring mechanism.

It will be appreciated by one skilled in the art that the level of the detent torque decreases relatively fast as rotor magnet 10 snaps away from a given detent location, allowing rotor magnet 10 to rapidly accelerate to the other detent location since rotor magnet 10 may be designed to have a relatively low moment of inertia. It will be appreciated that this rapid angular acceleration between detent locations can advantageously develop irrespective of whether the driving rotational input exhibits a relatively low-rate of rotation.

As may be appreciated in FIGS. 5 and 6, a coil assembly 28 is magnetically coupled to rotor magnet 10 and pole-piece assembly 20 to generate a signal in response to rotation of rotor magnet 10 between the detent locations. For example, the magnetic circuit which links rotor magnet 10 to coil assembly 28 may be sufficiently (e.g., relatively tightly) magnetically coupled to generate the signal in response to rotation of rotor magnet 10. In one example embodiment, coil assembly 28 may generate a pulse when the magnetic flux applied by rotor magnet 10 rapidly reverses its direction as rotor magnet 10 snaps from one detent position to another detent position. This allows harvesting of electrical energy even during conditions where the rotational rate of driving rotational input 14 practically approaches zero. It will be appreciated that the foregoing arrangement of torque storage at the detent locations and subsequent release effectively provides at least some decoupling of the reverse torque (e.g., back EMF) applied to rotor magnet 10 during power generation. Appropriate magnetic shielding may be provided to, for example, avoid interference due to external electromagnetic fields.

Figure 4:
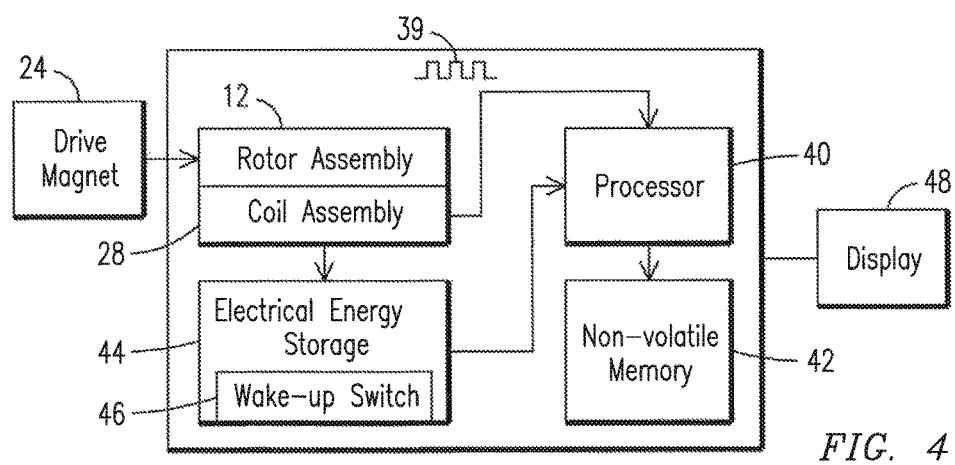
FIG. 4 is a block diagram representation of one example embodiment of a sensor and/or power harvesting apparatus embodying aspects of the present invention.

As shown in FIG. 4, the signal generated by the cooperative interaction of rotor assembly 12 and coil assembly 28 may comprise a stream of pulses 39. A processor 40, such as micro-processor, application specific integrated circuit (ASIC), etc., may be responsive to the signal from coil assembly 28 to determine at least one characteristic of the rotational input. In the example embodiment, where the driving rotational input may be effected by a fluid flow, the characteristic determined by processor 40 may be one or more of the following: a flow rate of the fluid flow, flow direction, quantity of flow over a period of time. In the example embodiment, where the driving rotational input may be effected by a rotating structure, the characteristic determined by processor 40 may be one or more of the following: a rotation rate of the structure, a direction of rotation of the structure, number of rotations over a period of time.

In one example embodiment, a non-volatile memory 42 may be used to store data indicative of the one or more characteristics of the rotational input determined by processor 40. In one example embodiment, one or more circuit components 44 (designated as electrical enemy storage) may be connected to accumulate electrical energy from the stream of pulses generated by coil assembly 28 regardless of whether the driving rotational input may comprise a relatively low rate of rotation. For example, the stream of pulses may be rectified by a rectifier and a rectified electrical output may be used to charge one or more storage capacitors.

In one example embodiment, a wake-up switch circuit 46 may be responsive to the stream of pulses from coil assembly 28 to wake-up processor 40 from a power-conserving mode. Data stored in non-volatile mommy 42 may be read by an external local device or by a remote device over a communications link (not shown). A display 48 may be optionally provided to display information regarding the rotational input. Display 48 may be arranged to operate just under power conditions when sufficient power is available. For example, such as when sufficient power is available to meet sensing requirements as well as display requirements.

In one example application, an apparatus embodying pole-piece assembly 20 and coil assembly 28 may be utilized to energize and generate sensing information for a fluid meter register 50 (FIG. 6), such a water meter register, gas meter register etc.

Example Embodiments Based on Magnetic Spring Effect

The description below focuses on embodiments based on utilization of a magnetic spring effect. It will be appreciated by those skilled in the art that previously described aspects—other than the modality or principle for causing the rapid angular acceleration of the rotor irrespective of whether the driving rotational input exhibits a relatively low-rate of rotation—remain equally applicable for this embodiment. Accordingly, aspects, such as signal processing, power harvesting, example applications, etc., will not be described again for the sake of avoiding burdensome and unnecessary repetition.

FIGS. 7-15 represent a temporal flow sequence of views for conceptually illustrating an example embodiment where a rotor magnet 62, which may be part of a rotor assembly 63 embodying further aspects of the present invention, can angularly accelerate in a relatively rapid fashion from a stopped condition due to a magnetic spring effect regardless of whether a driving rotational input may comprise a relatively low rate of rotation.

FIGS. 7-11 illustrate rotation of rotor magnet 62 in response to a rotating magnetic field 64, such as may be produced by a drive magnet 60 in response to a driving rotational input, such as a fluid flow, a rotating structure, etc. In one example embodiment, rotor magnet 62 may include a feature 66 (e.g., a protrusion, recess, etc.) that upon continued rotation of rotor magnet 62 eventually reaches and interferes with a suitable mechanical stop 68 (FIG. 11) that may be constructed at a predefined location of rotor assembly 63.

Figures 11, 12, 13, 14:
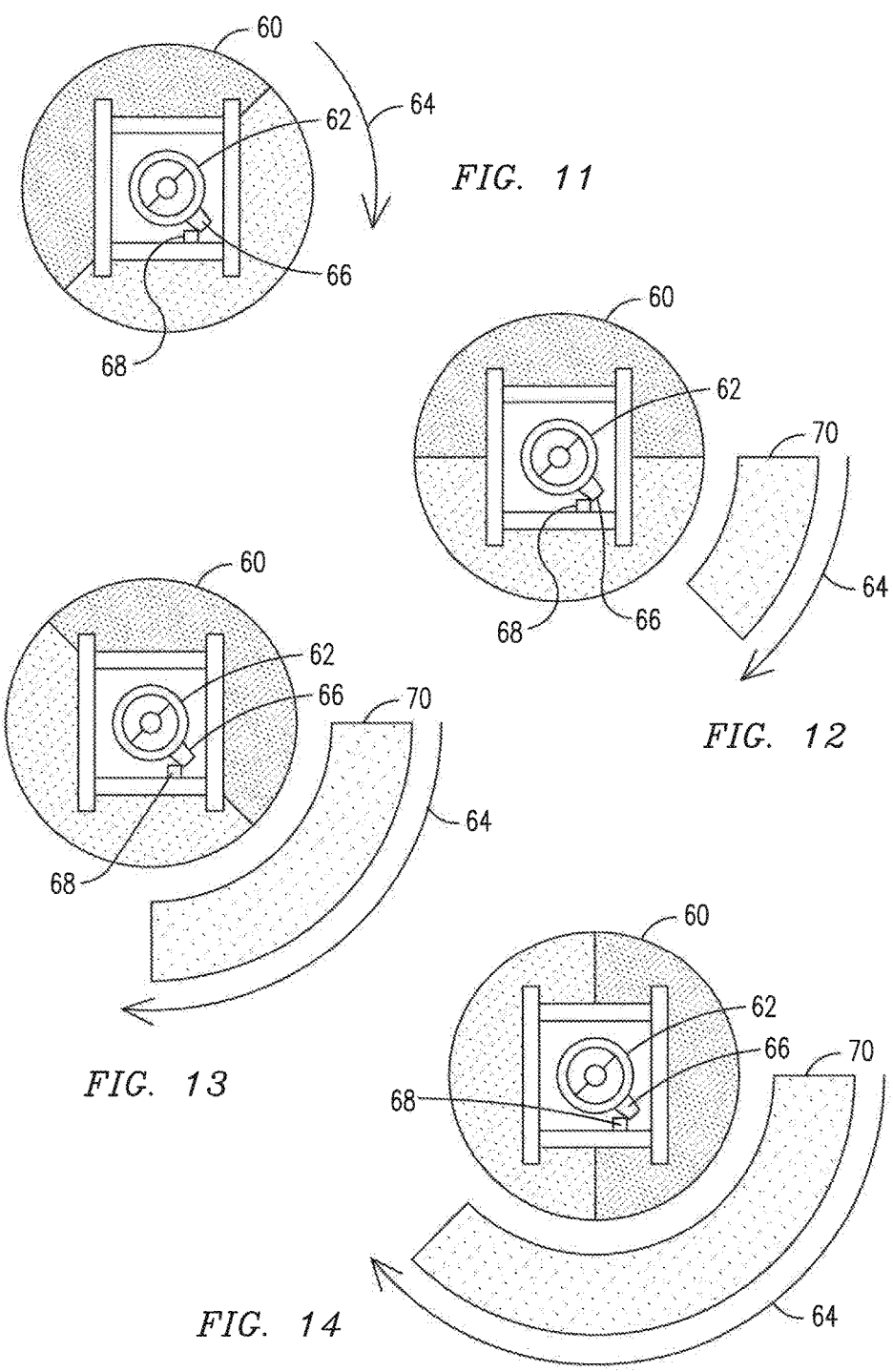
Figure 15:
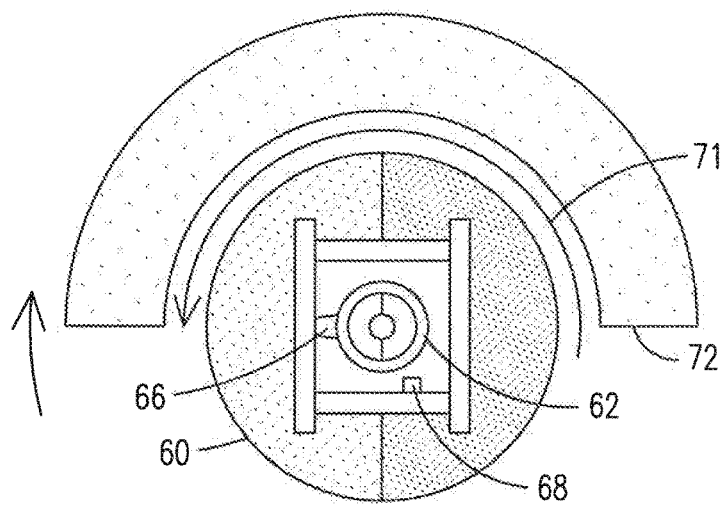

At this stage of the flow sequence, rotor magnet 62 remains stopped whilst the axial orientation of rotating magnetic field 64 may impose a magnetic force on rotor magnet 62 in a direction that circumferentially pushes rotor magnet 62 against stop 68. FIGS. 12-14 illustrate continued rotation of magnetic field 64 whilst rotor magnet 62 remains in a stopped condition. As magnetic field 64 continues to rotate, its axial orientation eventually transitions to a condition at which—in lieu of imposing a magnetic force on rotor magnet 62 in a direction that circumferentially pushes rotor magnet 62 against stop 68—magnetic field 64 will start to develop a magnetic force on rotor magnet 62 in a direction circumferentially opposite from stop 68.

It will be appreciated that at this stage of the flow sequence, a magnetic spring effect is being established between the stopped rotor magnet and the rotating magnetic field. A gradual winding-up condition of the magnetic spring effect is conceptually represented by the gradually increasing arc segments 70 illustrated in FIGS. 12-14. Eventually, the circumferentially pulling force (FIG. 15) substantially and rapidly increases in magnitude and causes rotor magnet 62 to rapidly rotate away, as indicated by arrow 71, (this rapid return rotation may be referred to as a flyback event for the rotor) from mechanical stop 68 until the magnetic field of rotor magnet 62 re-acquires the rotating magnetic field 64 and the temporal flow sequence resumes at FIG. 7. The rapid unwinding action of the magnetic spring effect (e.g., rapid energy release) is conceptually represented by arc segment 72 in FIG. 15.

It will be appreciated that during the flyback event, a relatively high amount of electrical power can be harvested through a coil assembly 75 (FIG. 16) because of the rapid angular velocity of the rotor. Coil assembly 75 is magnetically coupled to rotor magnet 62 and will generate a signal in response to the rapid rotation of the rotor magnet away from the mechanical stop. The rate of flyback rotation can be relatively high compared to the driving rotational input, regardless of the rate of rotation of the driving rotational input. Thus, energy can be extracted even for driving rotational inputs that may approach practically a zero rate of rotation.

Figure 16:
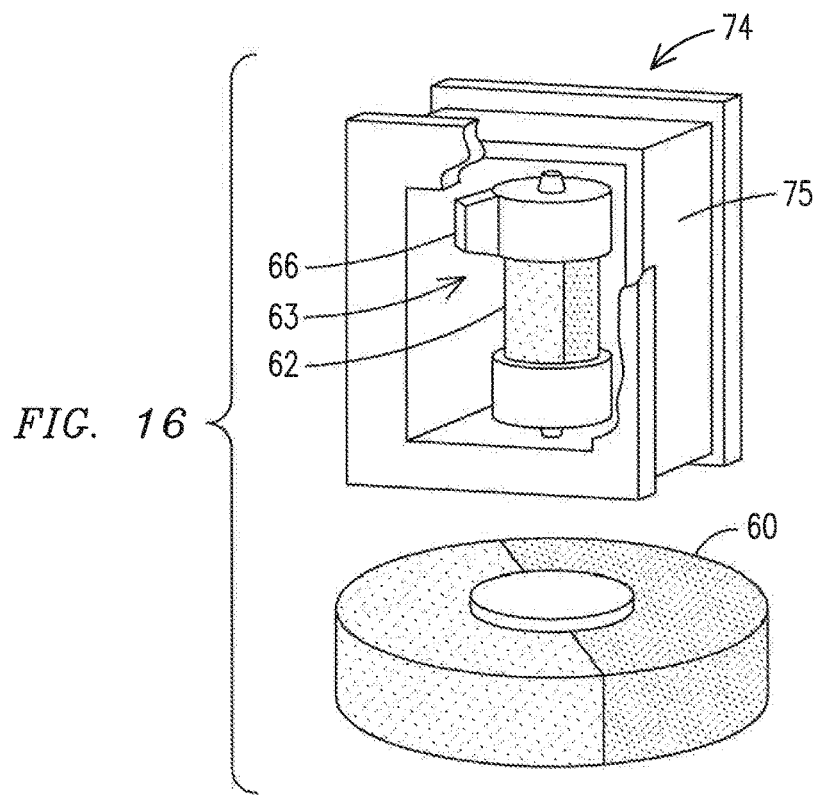
FIG. 16 is an isometric view of one example embodiment of a sensor and/or power harvesting apparatus embodying aspects of the present invention, such as may be implemented by utilization of a magnetic spring effect.

FIG. 16 is an isometric view of one example embodiment of a sensor and/or power harvesting apparatus 74 embodying aspects of the present invention, such as may be implemented by utilization of the above-discussed magnetic spring effect. The coil assembly may be arranged to encompass the rotor (e.g., a co-axial arrangement), in which case there is no need for a pole assembly to provide a magnetic circuit to direct the flux of the rotor to the coil. Alternatively, in a non-coaxial arrangement, a basic pole assembly may be readily arranged to couple the flux from the rotor to the coil assembly.

It will be appreciated by those skilled in the art that in one example implementation, the rotor shape may be designed to have the lowest rotational inertia that can be achieved for a given magnetic dipole. This would allow the rotor to achieve the highest angular velocity during the flyback event, thereby practically maximizing the amount of energy that can be harvested by the coil assembly. In practice, this would suggest that relatively tall and thin rotor shapes may be relatively more efficient than disk-shaped rotors. Tradeoff considerations may be considered so that the angular velocity during the flyback event is not so excessively high to avoid the possibility that the magnetic field of rotor magnet 62 overshoots the rotating magnetic field 64 since this could lead to undesirable transients, such as may involve transient rotor oscillation.

The stop may be arranged to function both for clockwise and counterclockwise directions of rotation of the driving field. Thus, a sensing apparatus may be responsive to a driving rotational input, regardless of its direction of rotation. Tradeoffs may be considered regarding the relative positioning of the coil assembly and the circumferential location of the stop. For example, such relative positioning may be arranged to provide a symmetric response to clockwise and counterclockwise rotation so as to maximize the amount of power that can be extracted, but may lack rotation direction information. Thus, in certain applications, an asymmetric response may be used to provide the ability to distinguish clockwise and counterclockwise rotation. As suggested above, such an asymmetric response may not provide a maximal power harvesting capability.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A sensor apparatus comprising:
   a rotor assembly comprising a rotor magnet responsive to a driving rotational input;
   a pole-piece assembly magnetically coupled to the rotor magnet and having a pole-piece configured to effect a respective detent torque in at least two detent locations, wherein, as the driving rotational input rotates beyond a threshold angle said detent torque is overcome, which causes the rotor magnet to angularly accelerate towards the other one of said at least two detent locations irrespective of a relatively low rate of rotation of the driving rotational input;
   a coil assembly magnetically coupled to the rotor magnet and the pole-piece assembly to generate a signal in response to rotation of the rotor magnet between said at least two detent locations; and
   a processor responsive to the signal from the coil assembly to determine data indicative of at least one characteristic of the rotational input.

2. The sensor apparatus of claim 1, wherein the driving rotational input is effected by a fluid flow and said at least one characteristic of the rotational input comprises one or more of the following: a flow rate of the fluid flow, a quantity of flow over a period of time and a direction of the flow.

3. The sensor apparatus of claim 1, wherein the driving rotational input is effected by a rotating structure and said at least one characteristic of the rotational input comprises one or more of the following: a rotation rate of the structure, a number of rotations over a period of time and a direction of rotation of the structure.

4. The sensor apparatus of claim 1, further comprising a drive magnet to magnetically convey the driving rotational input to the rotor magnet.

5. The sensor apparatus of claim 1, wherein the signal generated by the coil assembly comprises a stream of pulses.

6. The sensor apparatus of claim 5, further comprising at least one circuit component arranged to accumulate electrical energy from the stream of pulses generated by the coil assembly.

7. The sensor apparatus of claim 1, further comprising a non-volatile memory to store the data from the processor.

8. The sensor apparatus of claim 1, wherein the respective detent torque is effected in said at least two detent locations by way of magnetic coupling.

9. The sensor apparatus of claim 1, wherein the respective detent torque is effected in said at least two detent locations by way of mechanical coupling.

10. The sensor apparatus of claim 1, wherein the respective detent torque is effected in said at least two detent locations by way of magnetic coupling and/or mechanical coupling.

11. A flow meter register comprising the sensor apparatus of claim 1.

12. A power-harvesting apparatus comprising:
a rotor assembly comprising a rotor magnet responsive to a driving rotational input;
a pole-piece assembly magnetically coupled to the rotor magnet and having a pole-piece configured to effect a respective detent torque in at least two detent locations, wherein, as the driving rotational input rotates beyond a threshold angle said detent torque is overcome, which causes the rotor magnet to angularly accelerate towards the other one of said at least two detent locations irrespective of a relatively low rate of rotation of the driving rotational input;
a coil assembly magnetically coupled to the rotor magnet and the pole-piece assembly to generate a signal comprising a stream of pulses in response to rotation of the rotor magnet; and
at least one circuit component connected to the coil assembly to receive the stream of pulses generated by the coil assembly and accumulate electrical energy extracted from the received stream of pulses.

13. The power-harvesting apparatus of claim 12, wherein the driving rotational input is effected by a fluid flow.

14. The power-harvesting apparatus of claim 12, wherein the driving rotational input is effected by a rotating structure.

15. The power-harvesting apparatus of claim 12, further comprising a drive magnet to magnetically convey the driving rotational input to the rotor magnet.

16. The power-harvesting apparatus of claim 12, wherein the respective detent torque is effected in said at least two detent locations by way of magnetic coupling.

17. The power-harvesting apparatus of claim 12, wherein the respective detent torque is effected in said at least two detent locations by way of mechanical coupling.

18. The power-harvesting apparatus of claim 12, wherein the respective detent torque is effected in said at least two detent locations by way of magnetic coupling and/or mechanical coupling.

19. A flow meter register comprising the power-harvesting apparatus of claim 12.

20. Apparatus for sensing and power-harvesting comprising:
a rotor assembly comprising a rotor magnet responsive to a driving rotational input;
a pole-piece assembly magnetically coupled to the rotor magnet and having a pole-piece configured to effect a respective detent torque in at least two detent locations, wherein, as the driving rotational input rotates beyond a threshold angle said detent torque is overcome, which causes the rotor magnet to angularly accelerate towards the other one of said at least two detent locations irrespective of a relatively low rate of rotation of the driving rotational input;
a coil assembly magnetically coupled to the rotor magnet and the pole-piece assembly to generate a signal comprising a stream of pulses in response to rotation of the rotor magnet;
a processor to determine data indicative of at least one characteristic of the rotational input;
a wakeup switching circuit responsive to the stream of pulses to awake the processor from a power saving condition to determine said at least one characteristic of the rotational input based on the stream of pulses from the coil assembly; and
at least one circuit component connected to the coil assembly to further receive the stream of pulses generated by the coil assembly and accumulate electrical energy extracted from the received stream of pulses.

21. A sensor apparatus comprising:
a drive magnet arranged to produce a rotating magnetic field in response to a driving rotational input;
a rotor assembly comprising a rotor magnet responsive to the rotating magnetic field from the drive magnet, wherein the rotor assembly includes a mechanical stop to impede further rotation of the rotor magnet beyond a predefined location of the rotor assembly as the rotating magnetic field continues to rotate, wherein a magnetic spring effect is established between the stopped rotor magnet and the rotating magnetic field, which eventually causes the rotor magnet to angularly accelerate and rotate away from the mechanical stop irrespective of a relatively low rate of rotation of the driving rotational input;
a coil assembly magnetically coupled to the rotor magnet to generate a signal in response to the rotation of the rotor magnet away from the mechanical stop; and
a processor responsive to the signal from the coil assembly to determine data indicative of at least one characteristic of the rotational input.

22. The sensor apparatus of claim 21, wherein the driving rotational input is effected by a fluid flow and said at least one characteristic of the rotational input comprises one or more of the following: a flow rate of the fluid flow, a quantity of flow over a period of time and a direction of the flow.

23. The sensor apparatus of claim 21, wherein the driving rotational input is effected by a rotating structure and said at least one characteristic of the rotational input comprises one or more of the following: a rotation rate of the structure, a number of rotations over a period of time and a direction of rotation of the structure.

24. The sensor apparatus of claim 21, wherein the signal generated by the coil assembly comprises a stream of pulses.

25. The sensor apparatus of claim 24, further comprising at least one circuit component connected to the coil assembly to receive the stream of pulses generated by the coil assembly and accumulate electrical energy extracted from the received stream of pulses.

26. The sensor apparatus of claim 21, further comprising a non-volatile memory to store the data from the processor.

27. A flow meter register comprising the sensor apparatus of claim 21.

* * * * *